United States Patent [19]

Dunn

[11] Patent Number: 5,060,460
[45] Date of Patent: Oct. 29, 1991

[54] CYLINDER MOWER AIR-LIFTED GRASS CUTTINGS

[75] Inventor: Kenneth Dunn, Mowden Park, United Kingdom

[73] Assignee: Electrolux Northern limited, Durham, United Kingdom

[21] Appl. No.: 541,912

[22] Filed: Jun. 21, 1990

[30] Foreign Application Priority Data

Jun. 22, 1989 [GB] United Kingdom ............... 8914324

[51] Int. Cl.$^5$ ............................................. A01D 34/12
[52] U.S. Cl. ..................................... 56/12.8; 56/13.3; 56/198
[58] Field of Search .................. 56/12.8, 12.9, 13.3, 56/13.4, 198, 199, 200, 252

[56] References Cited

U.S. PATENT DOCUMENTS

| 986,883 | 3/1911 | Wessel, Jr. | 56/199 |
|---|---|---|---|
| 3,691,740 | 9/1972 | Weber | 56/198 |
| 3,729,908 | 5/1973 | Miner | 56/199 X |
| 3,838,558 | 10/1974 | Goodchild | 56/12.8 |
| 4,361,001 | 11/1982 | Almond et al. | 56/12.8 |

FOREIGN PATENT DOCUMENTS 903486 6/1972 Canada ............................... 56/200

*Primary Examiner*—William P. Neuder
*Attorney, Agent, or Firm*—Pearne, Gordon, McCoy & Granger

[57] ABSTRACT

A driven cylinder mower comprises a mower body 101 and a grass box. An electric motor drives a cutter assembly 202, and also a turbo fan drawing air through an opening 207, both mounted in the body. The grass box has a mouth 204 over the cutters and an opening 302 which mates with the opening 207 in the mower body, and through which the turbo fan sucks air from the cutting region through the grass box. The air from the turbo fan may be discharged within a skirt on the underside of the mower body to assist in supporting the mower above the ground. This skirt, and the land wheels and rear roller, lie behind the cutters, so as to avoid flattening the grass before it reaches the cutters. The land wheels are preferably inset, so that they run only on cut grass.

7 Claims, 8 Drawing Sheets

CYLINDER MOWER AIR-LIFTED GRASS CUTTINGS

The present invention relates to mowers and in particular to cylinder mowers in which the cutting cylinder is driven by a prime mover such as an electric motor or an internal combustion engine.

Cylinder mowers usually include a front roller disposed forwardly of the cutter and such mowers may operate inefficiently for a number of reasons. The mower body and/or front roller tend to push the grass forward during advancement of the mower thereby bending the grass over and flattening it towards the ground. This is particularly the case if the grass is at all long and/or wet so that the blades tend to pass over the so-bent grass without cutting it. Also not infrequently, when grass is cut, some of the cut grass tends to fall back between cutting edges of the cylindrical cutter blades where it may clog against fixed cutter blades adding to the load on the motor by being unnecessarily cut again one or more times, and perhaps even stalling the motor. Moreover grass cutting which fall to the ground, as opposed to being collected in a grass collector box may cause the mower to ride unevenly on a lawn resulting in an uneven cut or causing the cutter to skim over uncut grass.

SUMMARY OF THE INVENTION

An object of the present invention, which is defined in the appended claims, is to provide an improved mower in which these difficulties are reduced.

BRIEF DESCRIPTION OF THE DRAWINGS

A lawn mower according to the invention will now be described with reference to the accompanying drawings, in which.

DETAILED DESCRIPTION OF THE PREFERRED EMBODIMENT

Figure 1:
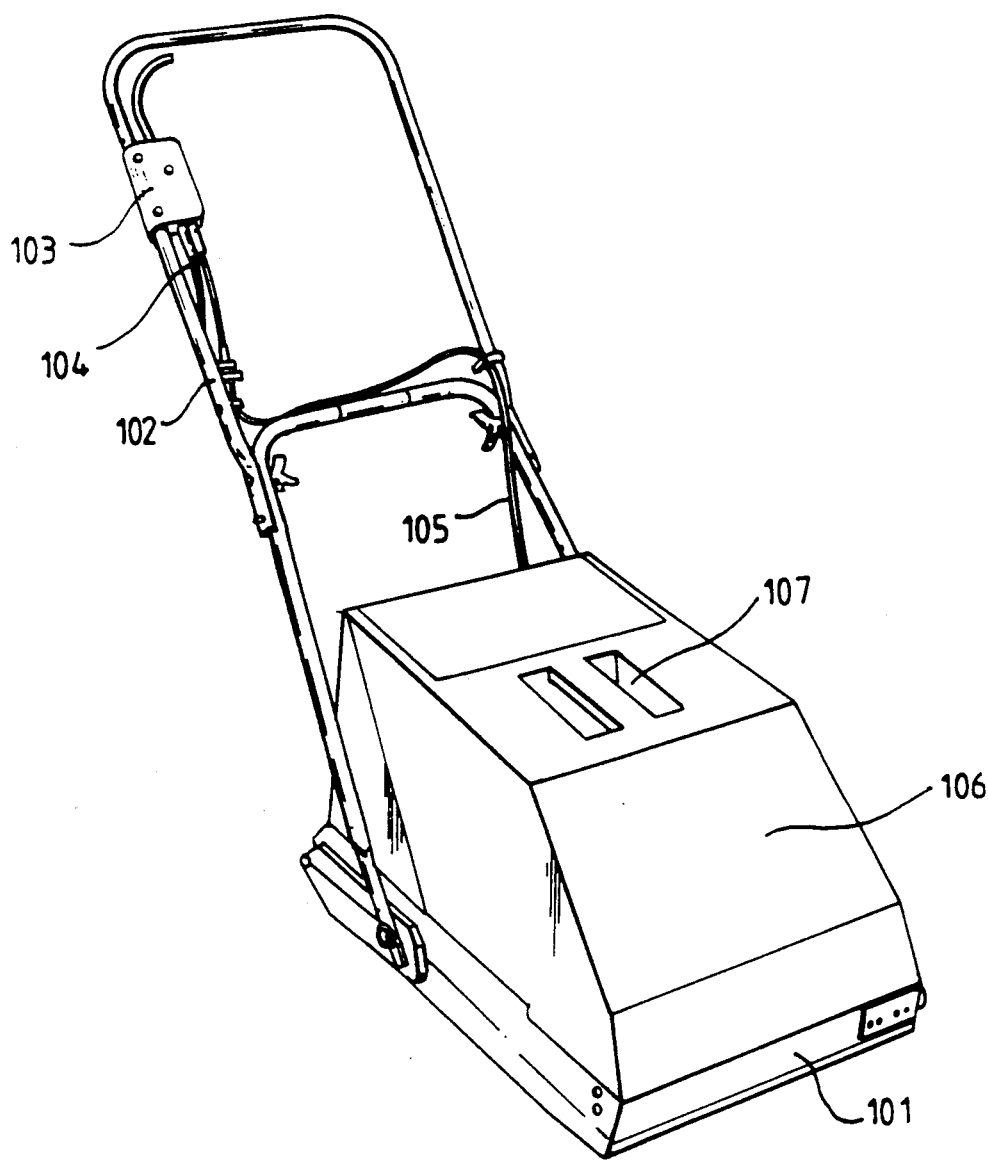
FIG. 1 is a perspective view of the mower.

Referring to FIG. 1 the mower has a body 101, a fold-down handle 102. A switch 103 is carried on the handle and, as shown, the switch has an operating lever and electric leads 104, 105 for connection to an electric supply, and for supplying current to the motor which drives the cutter cylinder.

A grass box 106 fits on top of the mower body and is provided with a handle 107 so that it can easily be lifted off for emptying or for access to the top of the mower body.

Figure 2:
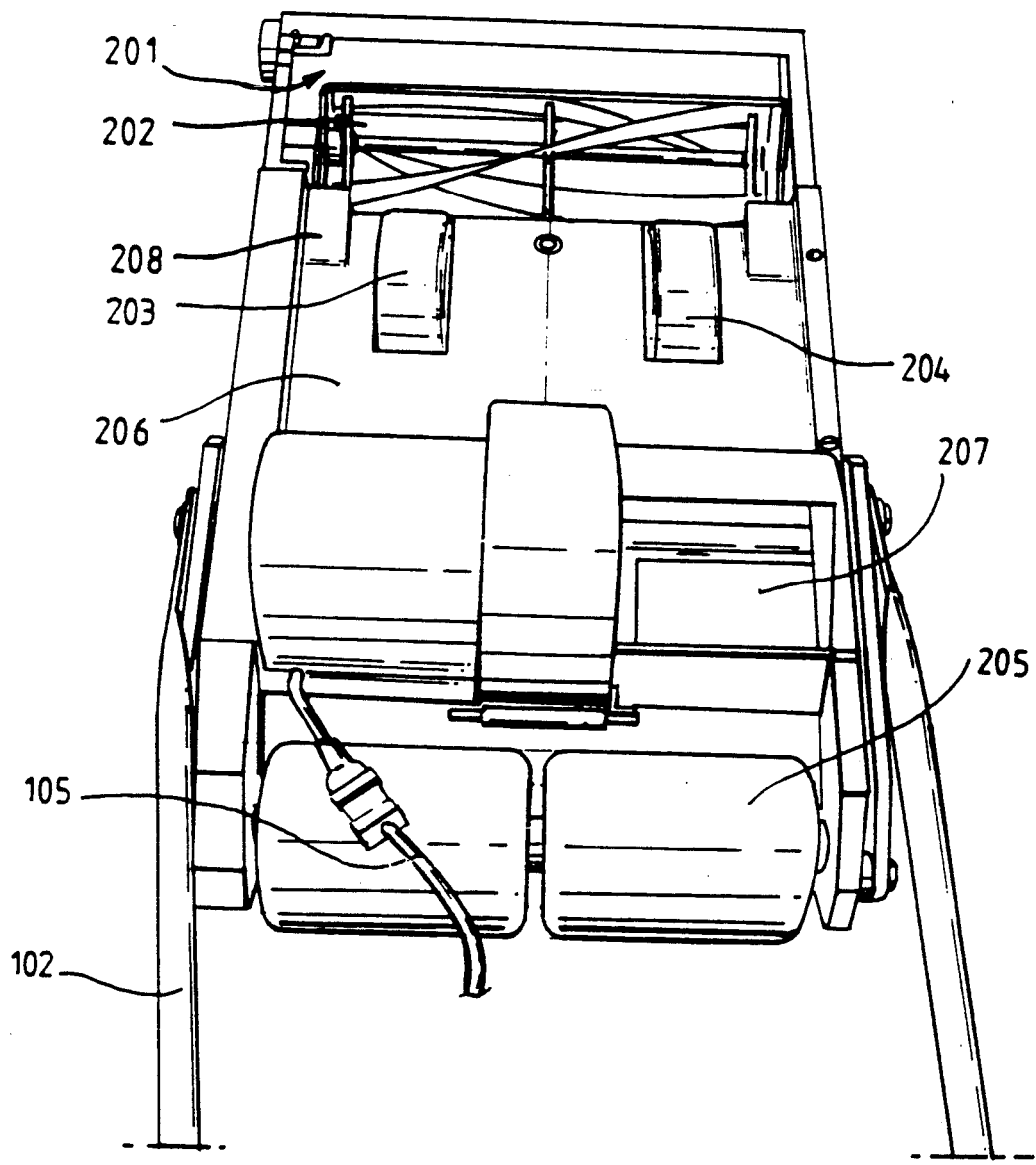
FIG. 2 is a top view of the mower body with the grass box removed.

FIG. 2 is a view of the mower body from the top, seen from the operator's position, the grass box having been removed.

The body of generally rectangular outline, and at the front is a rectangular aperture 201 within which is fitted the cutter assembly 202. The cutter assembly is a separate unit which is removable, and which, when in position, can be adjusted with respect to the body to vary the cutting height. The cutter hs a drive wheel which couples with a drive mechanism when the cutter assembly is in place in a manner which will be described more fully below. Reference may be made to our pending Patent Application No. 8914323.4.

The mower body is supported from the ground partly by a pair of land wheels 203, 204 and partly by a split rear roller 205. The land wheels 203, 204 are placed behind the cutter assembly and are inset so as to be within the width of the cutters, with the result that they run only on the cut surface of the grass, and do not flatten grass which has not yet been mown. The land wheels are shown on fixed axles, but they may be mounted on casters for ease of maneuvering or may be replaced by one or more rollers.

Between the wheels 203, 204 and the rear roller 205 is a housing 206, the cover of which is hinged to give access for cleaning and maintenance. The power lead 105 supplies power to a motor within this housing and which is not visible in the Figure, the shaft of which carries at its outer end a grooved drive pulley and at its inner end a turbo fan. The opposite side of the housing has an opening 207 which mates with a corresponding opening in the underside of the grass box when this is placed in position. This opening provides an air inlet for the turbo fan, so that the fan in operation draws air through the grass box. A further housing 208 accommodates the drive belt which couples the drive pulley to the cutting cylinder.

Figure 3:
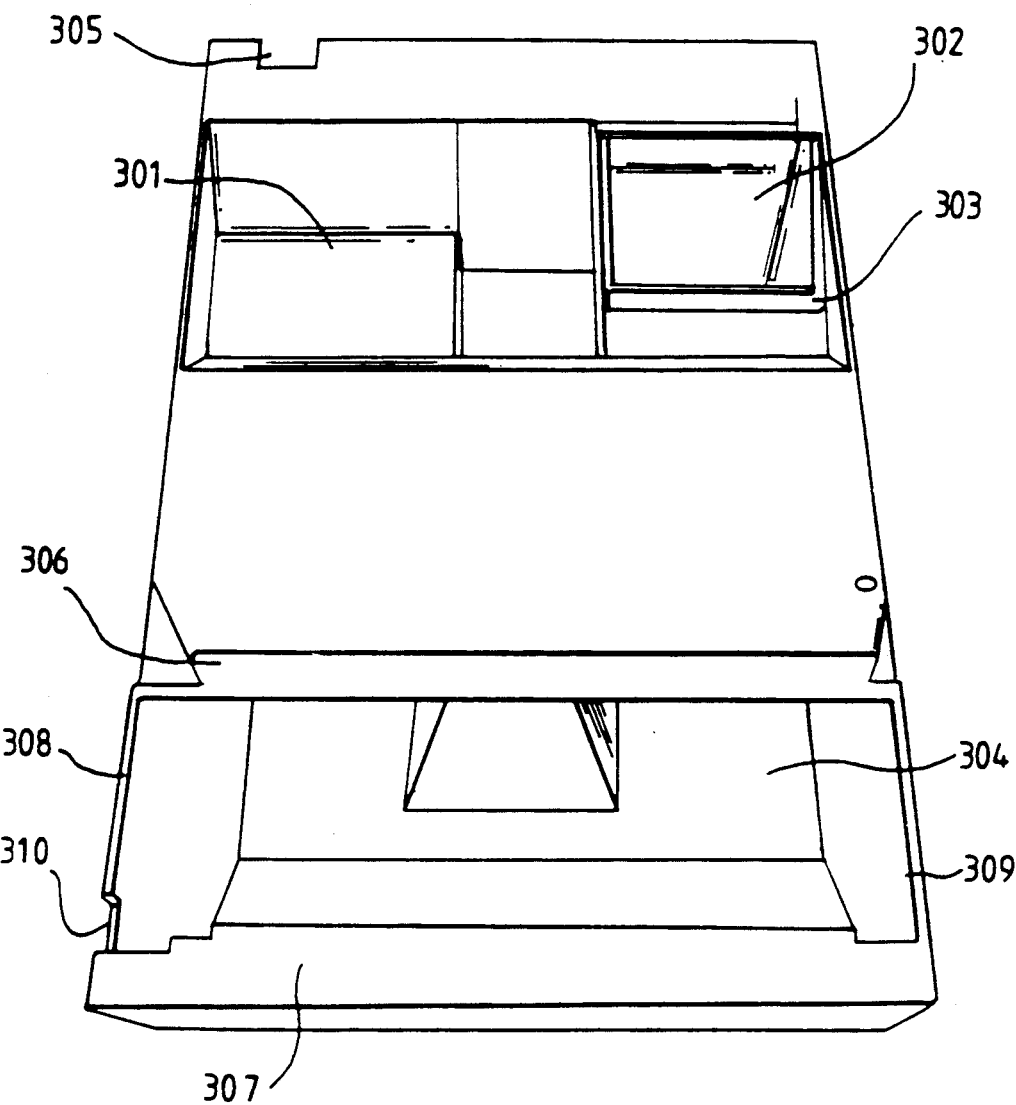
FIG. 3 shows the underside of the grass box.

FIG. 3 is a view of the grass box from the underside. It has a lower surface with a recess 301, conforming in shape to the housing 206, and an opening 302 which mates with the opening 207 in the housing 206. A gasket of foam plastic material 303 round this opening seals it against the entry of outside air, and a duct within the grass box extends towards the top, so that air is drawn from above the level of the cuttings in the grass box, and grass is not drawn through in quantities sufficient to clog the turbo fan. For the same purpose a grid (not shown in the drawing) fits loosely in the aperture 302.

The front end of the grass box is formed with a mouth 304, fitting over the top of the aperture 201 in the mower body which houses the cutter assembly, and which in operation allows air and grass cuttings to be drawn into the grass box by the suction created by the turbo fan. A notch 305 allows for the passage of the motor supply lead 105 from the switch on the handle.

Projection flanges 306, 307 assist in sealing the junction of the grass box mouth with the top of the cutter assembly aperture, and also locate the front end of the grass box with respect to the body. The rear portion of the grass box is located against the ends of the housing 206 by the end walls 308, 309 of the recess 301.

A cut-out 310 at the corner of the mouth accommodates a locking device for the cutting height adjustment which will be described in more detail with reference to FIG. 6.

Figure 4:
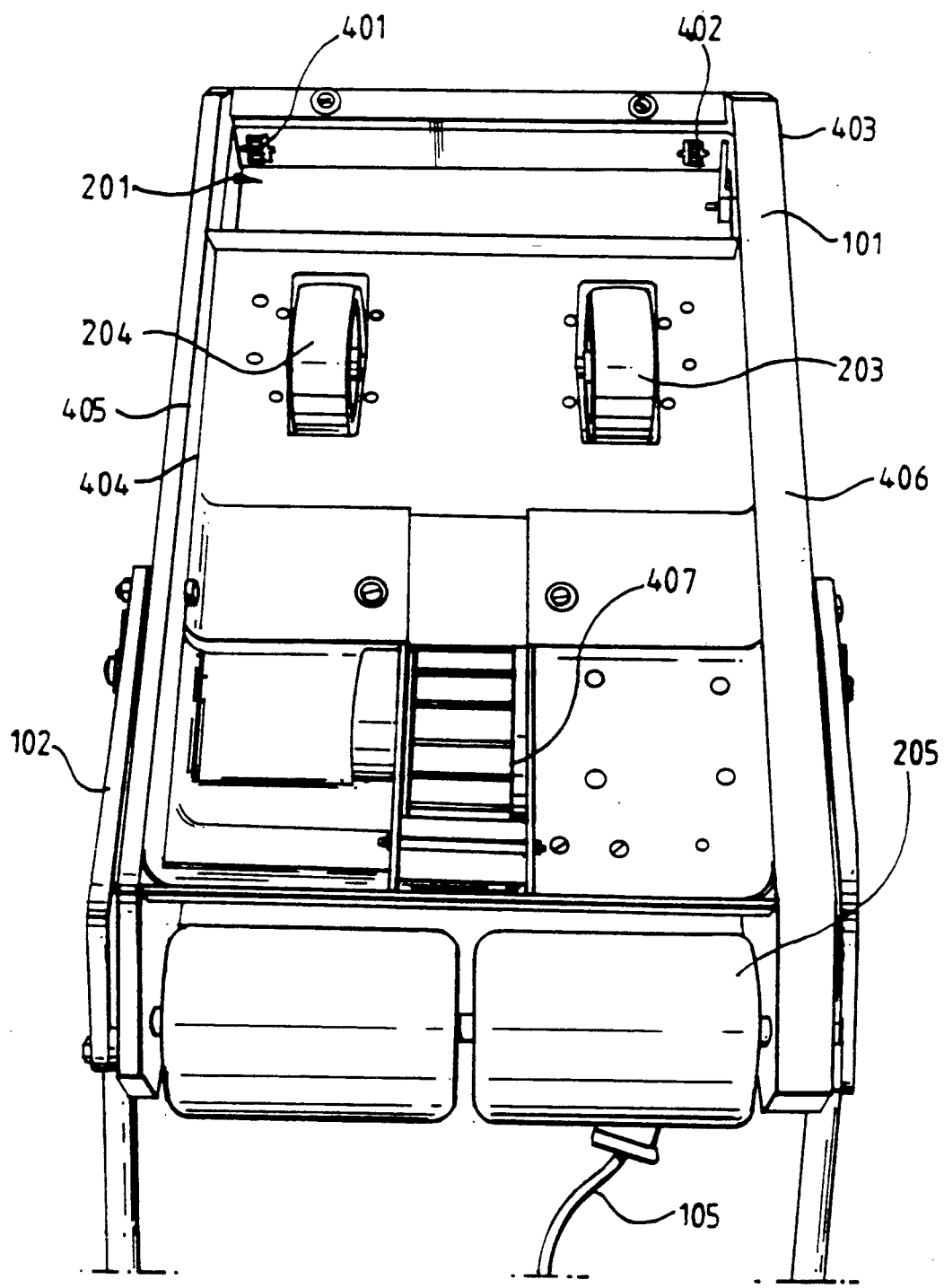
FIG. 4 shows the underside of the mower body, the cutter assembly having been removed.

FIG. 4 shows the underside of the mower body with the cutter assembly removed. This view shows the land wheels 203, 204, the rear roller 205, and the cutter assembly aperture 201. Within the aperture 201 are a pair of toothed wheel 401, 402 which, as will be explained below, engage toothed segments on the cutter assembly, enabling its position to be adjusted, and so the height of cut to be varied. These toothed wheels are mounted on a shaft rotatable by an adjusting knob 403.

The major part of the mower body underside between the rear roller 205 and the aperture 201 is enclosed by a skirt 404, comprising a strip running along the insides of the side members 405, 406 of the body, and across its width in front of the rear rollers and behind the cutter assembly aperture. This skirt extends down almost to ground level.

The turbo fan 407 exhausts the air which it has drawn through the grass box into the space within this skirt, and in operation the raised pressure within the skirt assits in supporting the mower from the ground, reducing the load on the land wheels and rear roller, and so making the mower easier to maneuver. Reference should be made to our pending Patent Application No. 8914325.9.

Figure 5:
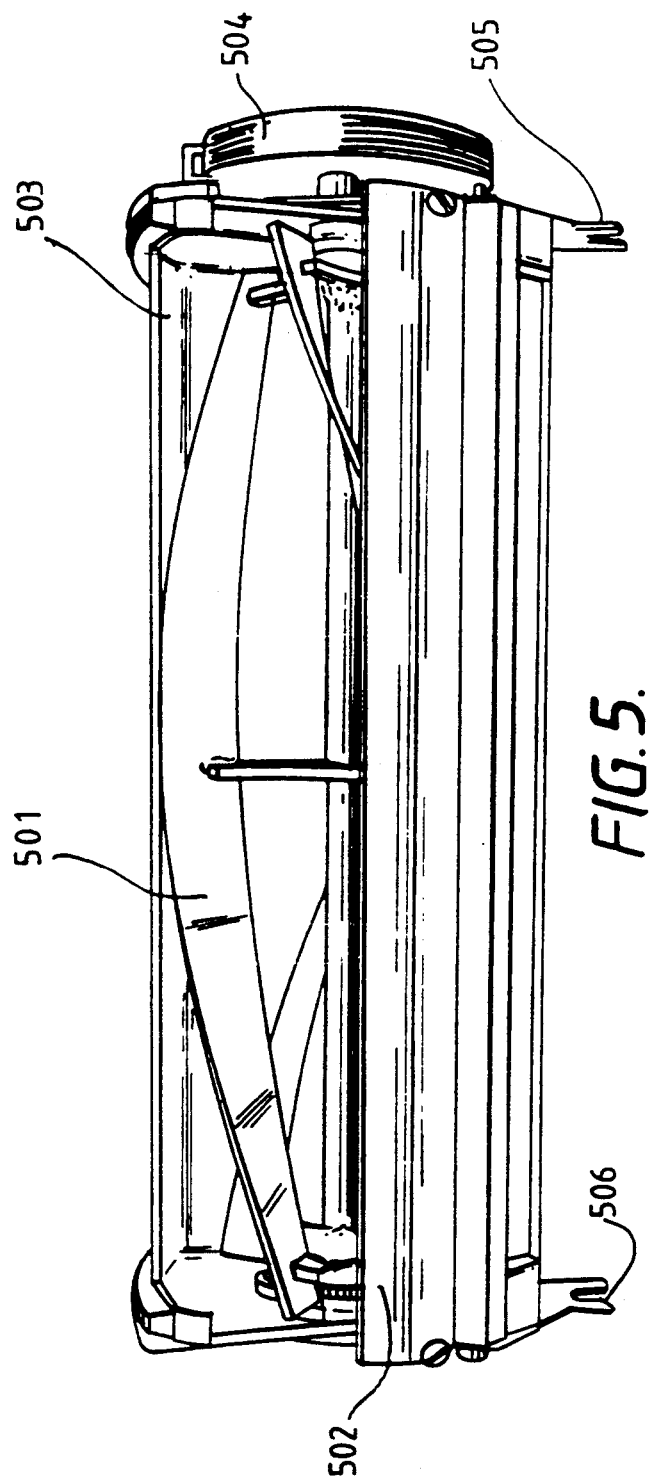
FIG. 5 is a view of the cutter assembly.

FIG. 5 is a view of the cutter assembly seen from the underside. The assembly consists of a cutting cylinder 501 having helical blades of conventional form, and a fixed blade 502. A shield 503 limits the ingress of air from the side of the cutter and helps direct the grass upwards into the mouth of the grass box. The cylinder shaft carries a drive wheel 504 in the form of a ribbed pulley which engages a poly-V drive belt, as will be explained below.

A pair of forked projections 505, 506 extend from the points near the ends of the cutter assembly and bear, when the assembly is in position, against pins or rods within the cutter assembly aperture, allowing the assembly to have some rotational movement about these pins or rods for height adjustment.

Figure 6:
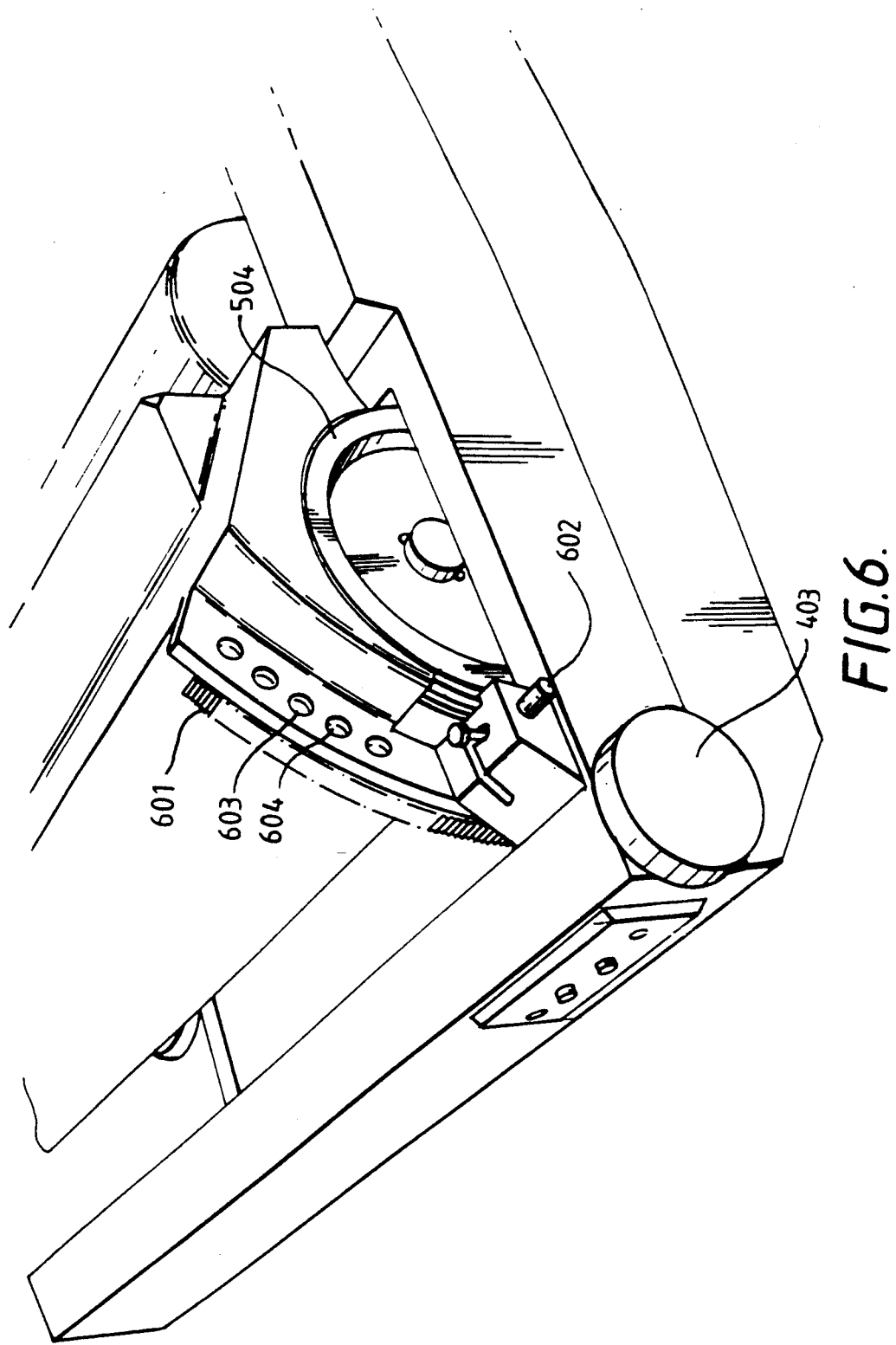
FIG. 6 is a detail of a corner of the mower body and one end of the cutter assembly showing the means of adjusting the cutting height.

FIG. 6 is a fragmentary view of the mower, showing the cutter assembly located in its aperture, but raised considerably above its normal operating position so as to show details of the height adjustment more clearly.

The drive pulley 504 engages a drive belt passing over a pulley within the body, as will be explained below, and the forks 505, 506 (see FIG. 5) bear against the axle of this pulley or against pins lying along its axis. The cutter assembly is supported between these forks and the toothed wheels 401, 402, (FIG. 4) which engage toothed segments, one which, 601, is visible in the Figure. The toothed wheels are rotated by means of the adjusting knob 403 to raise or lower the cutter assembly, and this adjustment causes the cutter assembly to pivot about the pins coaxial with the pulley on which the drive belt runs so that the drive pulley 504 always remains in engagement with this belt throughout the adjustment.

A locking bolt 602 on the mower body may be engaged in any one of a series of holes 603, 604 etc on the toothed segments 601 to lock it in the desired operating position.

The removable cutter assembly described above is the subject of our Patent Application No.

Figure 7:
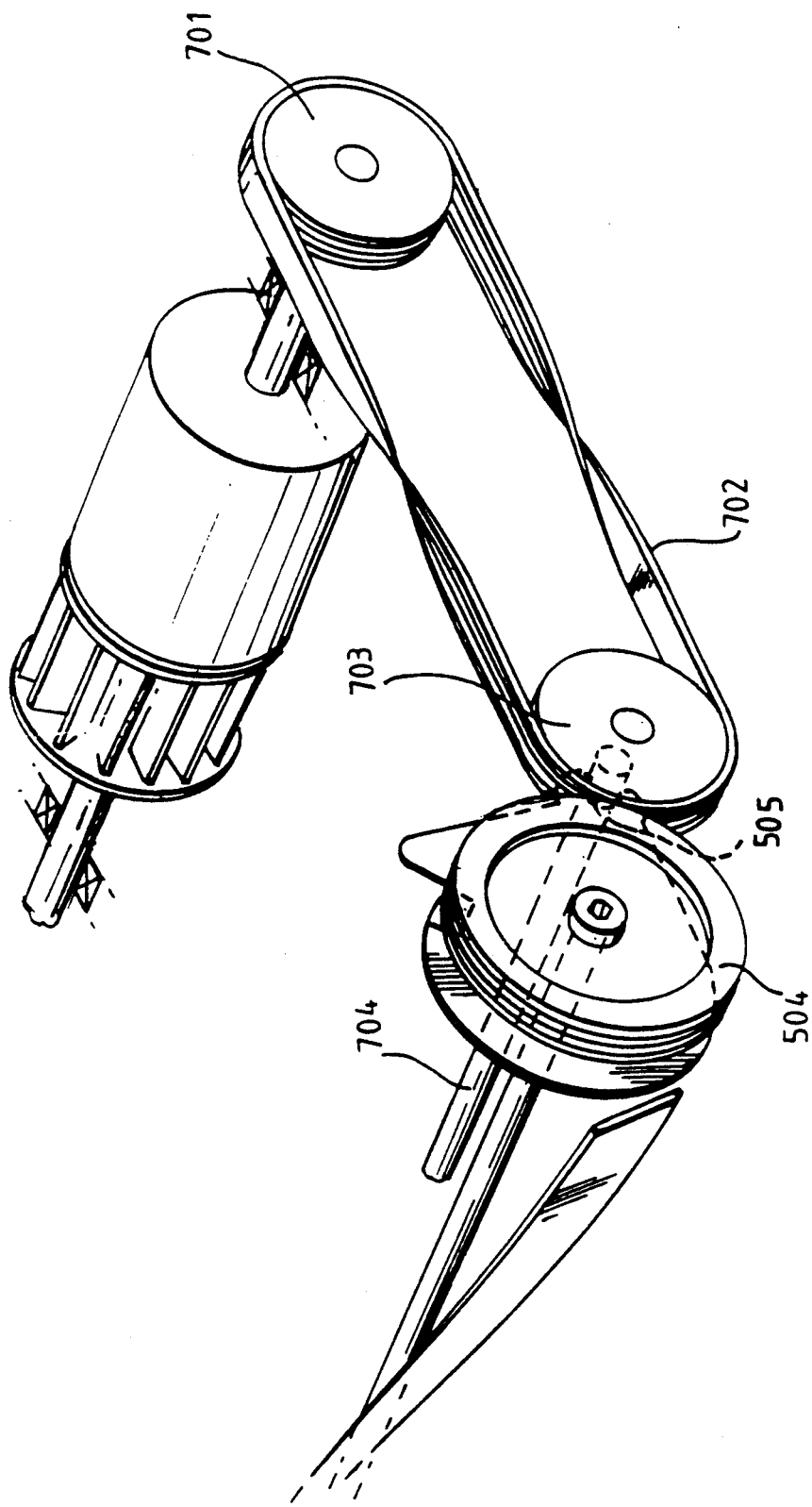
FIG. 7 shows diagrammatically the transmission means for supplying power to the cutting cylinder.
Figure 8:
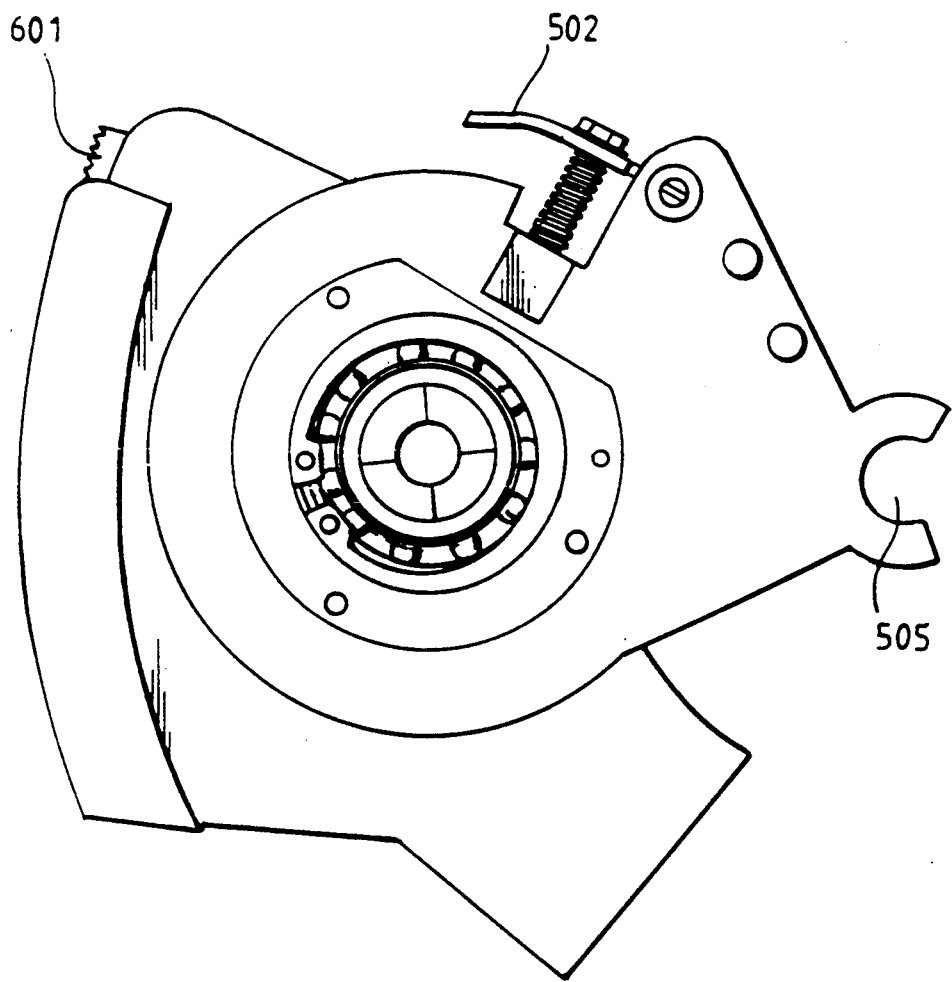
FIG. 8 is an end view of the cutter assembly of FIG. 6.

FIG. 7 shows diagrammatically the principle of operation of the drive mechanism. As already mentioned in connection with FIG. 2, the motor shaft carries at its outer end a pulley wheel shown in FIG. 7 at 701. This wheel has a grooved outer surface to mate with the ribbed surface of a drive belt 702. The belt 702 is of the poly-V type, having a pattern of friction-increasing ridges on its inner surface, and being flat on the outer surface.

The belt 702 passes over an idler wheel 703 mounted on an idler shaft 704. This wheel has a smooth outer surface.

Between the wheels 701 and 703 the belt 702 undergoes a twist of 180° in both its forward and return sections, so that where it passes over the idler wheel 703 the flat side is in contact with the wheel and the ribbed surface faces outwards.

When the cutter assembly is inserted into the aperture 201 of the body, its drive pulley 504 bears against the ribbed outer surface of the belt. The forked projections 505, 506 engage the shaft 704 and ensure that as the cutter assembly is raised or lowered it moves in a path centered on the axle of the pulley 701, so that the drive pulley 504 remains in contact with the ribbed surface of the belt as it passes over the idler 703.

In a modification, in order to reduce power loss and minimise wear, the idler wheel 703 is mounted on a short axle journalled in bearings, and the forks engage a rod or a pair of pins coaxial with the shaft 704.

This means of transmitting power to the cutters is the subject of our Patent Application No. 8914323.4.

In operation of the mower the turbo fan produces considerable suction in the grass box, and consequently at the region where cutting is taking place. This helps to hold the grass immediately in front of the cutters upright, so that it is more readily engaged by the fixed blade of the cutters, and it also removes the cut grass from the region of the cutters, so that is does not tend to clog the cutters or add unnecessarily to the load on them by falling back and being cut a second or third time. The grass borne in the airstream into the grass box is deposited there, where the velocity is slowed by the increased cross section offered to the airstream entering the grass box after which the air passes through the turbo fan and is ejected within the skirt under the mower, assisting to support it, and so reducing the load on the land wheels and roller, and easing the progress of the mower, so that it has less tendency to dig in, or to lift and skim over the uncut grass.

It will be appreciated that the cutter assembly is completely removable. It may therefore be replaced by alternative equipment, for example a fertilizer distributer, a scarifier, a brush for gathering fallen leaves, or any other device suitable for treating the surface of a lawn or path. Power for the device, if any is required, may be supplied by a drive wheel engaging the belt in the same manner as described for the cutter mechanism of the mower.

I claim:

1. A power driven cylinder mower including a mower body, a cylindrical cutter assembly supported by the body and having at least two cutter blades, fan means, means for driving the fan means and means for applying suction derived from the fan means in the region of the cutter assembly so as to assist in urging cut grass clear of the cutter and transporting cut grass into a grass box.

2. A cylinder mower according to claim 1 comprising a grass box, means for detachably supporting the grass box on the mower body, the grass box including a mouth overlying the cylindrical cutter assembly and an exhaust vent which communicates with an inlet of the fan means.

3. A cylinder mower according to claim 1 in which the mower body is supported from the ground by means lying wholly to the rear of the cylindrical cutting assembly.

4. A cylinder mower according to claim 1 wherein the mower body includes an under surface including an outlet for pressure air discharged by the fan means, and a skirt portion surrounding a major portion of the under surface of the mower body and extending close to the ground and encompassing the outlet aperture of the fan means, whereby the discharged air from the fan means assists in supporting the body from the ground.

5. A cylinder mower according to claim 1 in which the fan means comprises a power source for driving the cylindrical cutter and a turbo fan directly mounted on a driven shaft of the power source.

6. A cylinder mower according to claim 1 including support wheels disposed rearwardly of the cylindrical assembly.

7. A cylinder mower according to claim 6 wherein the support wheels are disposed within the transverse extent of the cylindrical cutter assembly.

* * * * *

UNITED STATES PATENT AND TRADEMARK OFFICE
CERTIFICATE OF CORRECTION

PATENT NO.  : 5,060,460

DATED       : October 29, 1991

INVENTOR(S) : Kenneth Dunn

It is certified that error appears in the above-identified patent and that said Letters Patent is hereby corrected as shown below:

```
Col. 1, line 19, after "between" insert --the--;
Col. 1, line 23, "cutting" should be --cuttings--;
Col. 2, line 6,  "hs" should be --has--;
Col. 2, line 67, "wheel" should be --wheels--;
Col. 3, line 14, "assits" should be --assists--;
Col. 3, line 44, after "one" insert --of--;
Col. 4, line 29, "is" should be --it--;
Col. 6, line 4,  after "cylindrical" insert --cutter--.
```

Signed and Sealed this

Thirtieth Day of March, 1993

Attest:

STEPHEN G. KUNIN

*Attesting Officer*

*Acting Commissioner of Patents and Trademarks*